(12) United States Patent
Maalej et al.

(10) Patent No.: US 7,555,076 B2
(45) Date of Patent: Jun. 30, 2009

(54) MODULAR DEVICE FOR MULTIPLE RECEPTION OF A MODULATED SIGNAL

(75) Inventors: Khaled Maalej, Paris (FR); Emmanuel Hamman, Paris (FR); Jean-Philippe Sibers, Paris (FR); Gérard Pousset, Paris (FR)

(73) Assignee: Dibcom, Palaiseau (FR)

( * ) Notice: Subject to any disclaimer, the term of this patent is extended or adjusted under 35 U.S.C. 154(b) by 462 days.

(21) Appl. No.: 10/504,448

(22) PCT Filed: Feb. 7, 2003

(86) PCT No.: PCT/FR03/00405

§ 371 (c)(1), (2), (4) Date: Apr. 4, 2005

(87) PCT Pub. No.: WO03/069802

PCT Pub. Date: Aug. 21, 2003

(65) Prior Publication Data

US 2006/0013346 A1 Jan. 19, 2006

(30) Foreign Application Priority Data

Feb. 13, 2002 (FR) .................................. 02 01779

(51) Int. Cl.
*H04L 1/02* (2006.01)
(52) U.S. Cl. ..................... 375/347; 375/148; 375/267; 375/316; 375/346; 375/349; 455/132; 455/302; 455/306
(58) Field of Classification Search .............. 375/148, 375/267, 316, 346, 347, 349
See application file for complete search history.

(56) References Cited

U.S. PATENT DOCUMENTS

| 2003/0112880 A1* | 6/2003 | Walton et al. ............ 375/260 |
| 2006/0291582 A1* | 12/2006 | Walton et al. ............ 375/267 |
| 2007/0170321 A1* | 7/2007 | Smed ..................... 248/181.1 |

FOREIGN PATENT DOCUMENTS

| EP | 0 725 497 | 8/1996 |
| FR | 2 786 048 | 5/2000 |

OTHER PUBLICATIONS

Debray B: "A New Differential Adaptive Moedem for Multipath Propagation", European Conference on Radio Relay Systesm. Edinburgh, Oct. 11-14, 1993, London, IEE, GB, vol. Conf. 4, Oct. 11, 1993, pp. 250-254, XP000479345, ISBN: 0-85296-594-X.

* cited by examiner

*Primary Examiner*—Chieh M Fan
*Assistant Examiner*—Siu M Lee
(74) *Attorney, Agent, or Firm*—Grossman, Tucker, Perreault & Pfleger, PLLC

(57) ABSTRACT

A reception device includes a number of reception paths and a decoder. The reception paths are sequenced and each reception path includes a calculation module embodied to deliver a combined confidence index and a combined data stream, from the confidence index and the equalized data stream for the current path, as well as, for the subsequent reception paths after the first path, from the combined confidence index and the combined data stream, for the preceding path. The decoder is embodied to only process the combined confidence index and the combined data stream, provided by the calculation module in the last path.

9 Claims, 2 Drawing Sheets

MODULAR DEVICE FOR MULTIPLE RECEPTION OF A MODULATED SIGNAL

RELATED APPLICATIONS

The subject application is a U.S. National Stage application that claims the priority of International Application No. PCT/FR03/00405, filed on 7 Feb. 2003, which claims the priority of French National Application No.: 02 01779, filed on 13 Feb. 2002.

FIELD OF THE INVENTION

The present invention relates to a modular device for multiple reception of a modulated signal.

BACKGROUND

Devices of this type are used, for example, for receiving signals modulated by orthogonal frequency division multiplexing, commonly known as OFDM or COFDM signals.

Conventionally, digital signals, such as television programmes, are coded, in order to be broadcasted by radio relay channel.

Communication by radio relay channel generates propagation irregularities as a result of reflections and echoes caused by the environment, among other things.

It is thus possible to receive a plurality of data streams, corresponding to the reception of a single source signal, in a plurality of different ways, this phenomenon being commonly known as multiple reception.

Multiple reception may be a space diversity, by separating two receivers, so that the fading of the source signal is relatively decorrelated at these two points, but it may also be a polarisation diversity, a frequency diversity or a temporal diversity, or else a combination of these techniques.

When the various multiply received streams, all representative of a single source signal, are combined, a better-quality data stream may be obtained than if a single stream had been used.

The received streams may be combined by a plurality of methods. For example, the best stream may be retained, or else a threshold may be defined from which a stream may be used.

An effective method of combining multiply received streams consists in producing weighted additions.

A confidence index is thus attributed to each stream, which is processed as a function of said index, all of the processed streams then being added, in order to issue a total data stream.

The best combination or "maximum ratio combining", commonly known as MRC, allows the maximum signal-to-noise ratio to be obtained at the output.

This combination is defined, in particular, in the article "Linear Diversity Combining Techniques" by D. G. Brennan, published in June 1959 by the ME (pp. 1075 to 1102).

The teaching of this article defines a combined datum or optimal ratio datum equal to the weighted data source for each channel.

The results obtained at the end of these combinations are sent to a weighted input decoder, such as a Viterbi decoder, for example, which decodes the total data stream in the conventional manner.

A device implementing a method of this type is also disclosed in the patent FR-B-2 788 048.

In this device, each reception channel issues a confidence index from this channel and data which is more or less amplified, as a function of this index.

All of the data and the confidence indices are used in a single combination step, issuing a total confidence index and a total data stream that are adapted to a weighted input decoder.

It thus appears in this device that the architecture is based on the juxtaposition of processing channels and on the use of a final, multiple input combination stage.

As a result, numerous functions are duplicated on each channel, and the summation/weighting function has to be incorporated on each channel or be implemented by a single, specially dimensioned circuit, which requires a considerable surface area for the substrate during production, in the form of electronic components.

It appears, therefore, that the existing devices are large, complex and expensive.

SUMMARY OF THE INVENTION

The object of the present invention is to respond to theses problems by providing a modulable receiver and optimising the electronic substrate.

The present invention relates to a device for receiving a Hertz signal, said device comprising a plurality of reception channels and a decoder with weighted inputs, each reception channel receiving at the input a data stream corresponding to said transmitted Hertz signal, and comprising a module for determining a confidence index and an equalisation module which is able to issue a stream of equalised data from the received data stream and from said confidence index, characterised in that the reception channels are sequenced, and in that each reception channel comprises a calculation module which is able to issue a combined confidence index and a stream of combined data from said confidence index and from said stream of equalised data for the current channel and also for the reception channels following the first channel, from the combined confidence index and the stream of combined data for the preceding reception channel, the outputs of the calculation module of the last channel forming a total confidence index and a total stream of combined data, said decoder with weighted inputs being able to process the combined confidence indexand the stream of combined data, issued only from the calculation module of the last channels.

According to other characteristics of the invention:

each calculation module comprises elementary calculation means, allowing a combined confidence index $CCSI_i$, such that $CCSI_i = CCSI_{i-1} + CSI_i$, to be issued from the confidence index $CSI_i$ for the current channel and the combined confidence index $CCSI_{i-1}$ for the preceding channel;

the calculation module for each channel comprises elementary calculation means, allowing a weighting coefficient al such that $\alpha_1 = CCS_{i-1}/CCSI_i$, as well as its complement relative to 1, to be defined from the combined confidence indices $CCSI_i$ and $CCSI_{i-1}$ for the current and preceding channels;

the calculation module for each channel comprises elementary calculation means, allowing a stream of combined data $CZ_i$, such that $CZ_i = \alpha_i \times CZ_{i-1} + (1-\alpha_i) \times Z_i$, to be issued from the stream of combined data $CZ_{i-1}$ for the preceding channel, the data stream $Z_i$ and the weighting coefficient $\alpha_i$ for the current channel;

the calculation module for each channel comprises at the input a synchronisation module which is able to synchronise the stream of combined data and the combined confidence index issued by the preceding reception channel, and the data stream and the confidence index issued by the current reception channel;

each reception channel also comprises means for formatting the received data stream, comprising at least one of the following elements: a tuner, an amplifier and a converter;

the device is produced, at least in part, using programmed components and/or dedicated components comprising connections which are able to implement the functions of this device;

the device comprises at least one microprocessor or microcontroller.

the device is able to receive at the input a multi-carrier signal.

said input signal is an OFDM or COFDM signal; and the device is able to receive television signals.

A better understanding of the invention will be facilitated by the following description, given solely by way of example, with reference to the accompanying drawings, in which:

DETAILED DESCRIPTION OF THE PREFERED EMBODIMENTS

Figure 1:
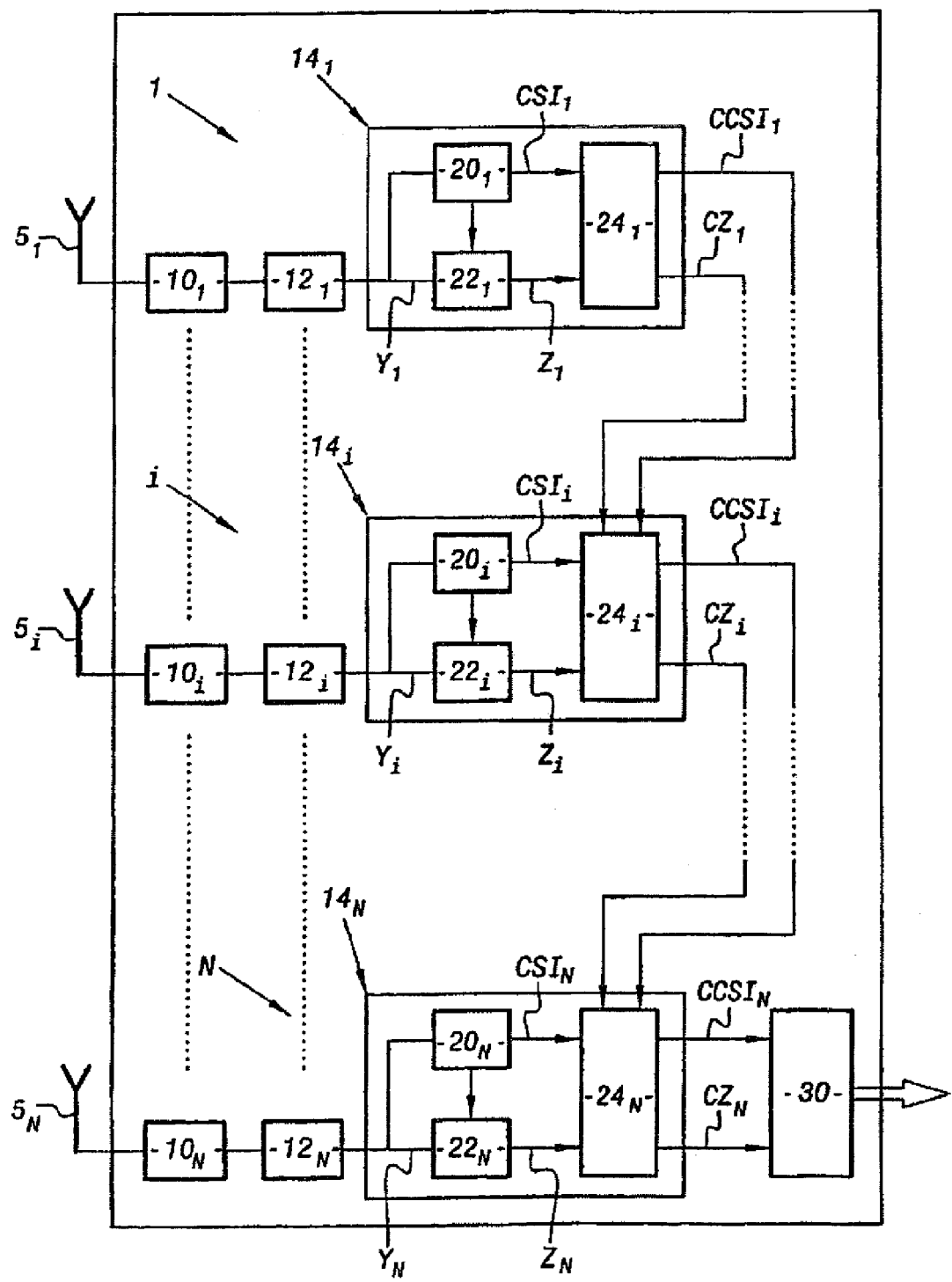
FIG. 1 is a schematic diagram of a receiver according to the invention.

FIG. 1 shows schematically the architecture of a device for multiply receiving a television signal.

As shown, the device I comprises a plurality of sequenced reception channels, 1 to N.

Conventionally, each reception channel i is associated with an antenna $5_i$, allowing a data stream to be received, all of the received streams corresponding to a single television signal.

For example, it is possible to distribute the ants $5i$ spatially such that the fading of the source signal is different on each antenna, and such that the received data streams are decorrelated from one another.

Similarly, the antennas $5_i$ may be able to receive different polaisations, such that each of the streams received for each of the reception channels, 1 to N, corresponds to the same initial signal, but with a different polarity.

Conventionally, each reception channel i comprises at the input means for formatting the received data stream, such as a tuner $10_i$, an amplifier and optionally a converter $12_i$.

Tuners $10_i$ allow the received signal to be transposed into an intermediate frequency that is more favourable for the processing to be carried out, and amplifiers and Converters $12_i$ allow the received stream to be amplified and converted into a stream of digital data.

For each channel i, the formatting means issue at the output a digital signal $Y_i$, corresponding to the data stream received on the antenna $5_i$, amplified and digitised.

Each reception channel then comprises a demodulator $14_i$, comprising a calculation module $20_i$ which allows a confidence index $CSI_i$, which relates to said module, to be issued from the signal $Y_i$, corresponding to the received data stream.

The confidence index $CSI_i$ is conventionally calculated by determining the signal-to-noise ratio of the received data stream. Each of the demodulators $14_i$ also comprises an equalisation module $22_i$, which allows a stream of equalised data $Z_i$ to be issued from the signal $Y_i$, corresponding to the arriving data stream, and from the corresponding confidence index $CSI_i$.

According to the invention, each reception channel also comprises a calculation module $24i$, allowing a combined confidence index $CCSI_i$ and a stream of combined data $CZ_i$ to be issued.

Each calculation module $24_i$ receives at the input the confidence index $CSI_i$ for its channel and the stream of equalised data $Z_i$ for its channel.

Moreover, each calculation module $24_i$, except for the module $24_i$ for the first reception channel, also receives the stream of combined data $CZ_{i-1}$ and the combined confidence index $CCSI_{i-1}$, issued by the calculation module $24_{i-1}$ for the preceding channel.

Thus, the module $24_2$ receives the results issued by the module $24_1$, and the module $24_N$ receives the results issued by the module $24_{N-1}$.

The calculation module $24_1$ for the first reception channel receives at the input only the data stream $Z_1$ and the confidence index $CSI_1$ for its reception channel. The inputs provided for the results issued by a preceding channel are predetermined and set to zero.

In an iterative construction, the calculation modules $24_i$ are therefore constructed in a cascade from one channel to the other, so as to use the results obtained in one channel for the calculations for the following channel.

Using the signals that they receive at the input, the calculation modules $24_i$ each issue the combined confidence index $CCSI_i$ and the stream of combined data $CZ_i$.

The information issued by the calculation module $24_N$ for the last reception channel forms a total confidence index and a total stream of combined data corresponding to an optimal ratio combined datum or "maximal ratio combining" (MRC). These two signals alone are sent directly to a decoder, with two weighted inputs, 30 of the device. This decoder 30 may be a Viterbi decoder or an iterative decoder, known as a turbo code decoder, and allows an optimised signal to be issued as a function of the data streams received by each of the reception channels.

A device of this type is particularly suitable for receiving signals comprising a plurality of frequencies, each carrying a portion of the information and being commonly known as multi-carrier signals.

The various channels each then receive all of the carriers, and the risk, associated with selective attenuation, of information loss is reduced In particular, in the multiple reception of a multi-carrier signal, such as an OFDM or COFDM signal, each reception channel receives a modulated signal comprising a plurality of carriers grouped together in symbols.

In order to reconstruct the emitted signal, the signals are combined according to carrier, a plurality of signals corresponding to the reception on the various channels or the same carrier in the same symbol are thus combined, such that the last channel issues a total stream of combined data comprising the same number of symbols and, within said symbols, the same number of carriers as the emitted signal.

Figure 2:
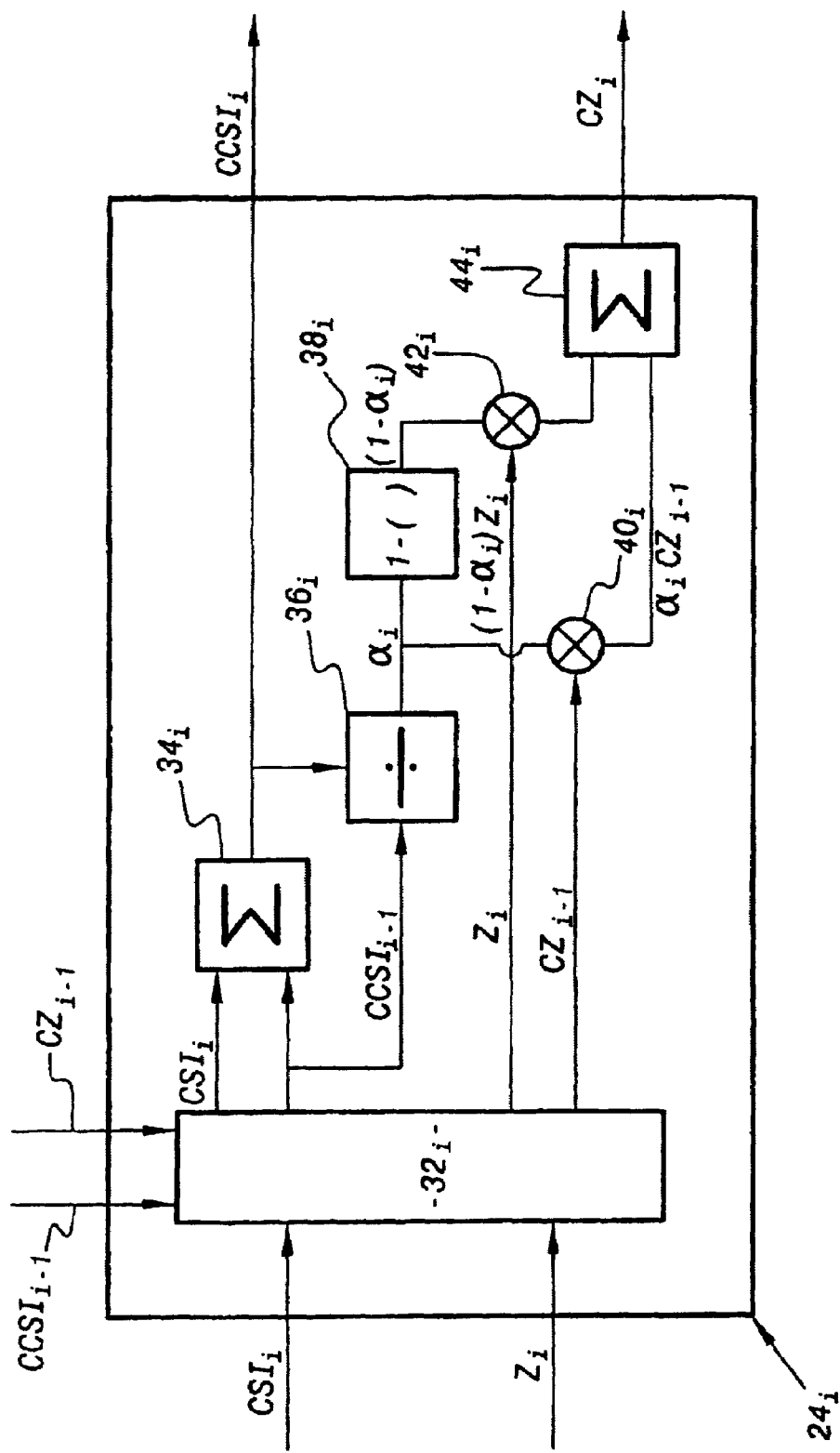
FIG. 2 is a schematic diagram of a calculation module used in a device according to the invention.

The elementary functions of an embodiment of a calculation module $24_i$ are described in greater detail with reference to FIG. 2.

As previously stated, the calculation module $24_i$ receives at the input the combined confidence index $CCSI_{i-1}$ and the stream of combined data $CZ_{i-1}$, both issued by the preceding reception channel i-1. This module also receives the stream of equalised data $Z_i$ and the confidence index $CSI_i$ that correspond to the current channel i.

First of all, all of theses inputs are introduced into a synchronisation module $32_i$, which allows them to be synchronised to a single tie reference. Generally, the data issued from the preceding channel is adjusted, so as to synchronise it with the data for the current channel. The preceding combined confidence index $CCSI_{i-1}$ and the current confidence index $CSI_i$ are then introduced into a summer $34_i$, which issues the current combined confidence index $CCSI_i$, such that $CCSI_i=CSI_i+CCSI_{i-1}$.

The combined confidence index $CCSI_{i-1}$ for the preceding channel and the current combined confidence index $CCSI_i$ are then introduced into a divider $36_i$.

The divider $36_i$ then issues at the output a weighting coefficient $\alpha_i$, defined by $\alpha_i=CCSI_{i-1}/CCSI_i$.

The coefficient $\alpha_i$ is then introduced into a subtracter $36_i$, in order to issue the complement of $\alpha_i$ relative to 1, by carrying out the process $1-\alpha_i$.

The stream of combined data $CZ_{i-1}$ and the weighting coefficient ai are then introduced into a multiplier $40_i$.

The datum $Z_i$ and the complement of $\alpha_i$ relative to 1 are also introduced into a multiplier $42_i$.

Finally, the results of the multipliers $40_i$ and $42_i$ are introduced into a summer $44_i$, which issues a current combined datum $CZ_i$, such that:

$$CZ_i=\alpha_i \times CZ_{i-1}+(1-\alpha_i) \times Z_i$$

The module $24_i$ thus issues a combined confidence index $CCSI_i$ equal to the sum of confidence indices for each of the channels 1 to i and a stream of combined data, such that:

$$CCSI_i = \sum_{j=1}^{i} CSI_j$$

and $$CZ_i=\alpha_i \times CZ_{i-1}+(1-\alpha_i) \times Z_i, \text{ wherein } \alpha_i=CCSI_{i-1}/CCSI_i$$

The equations thus obtained are generic equations which may be applied to all of the reception channels.

Thus, for the first reception channel, the application of these formulae allows the following to be determined:

$$CCSI_1=0+CSI_1=CSI_1 \text{ and}$$

$$\alpha_1=0 \text{ such that } CZ_1=\alpha_1 \times 0=(1-\alpha_1) \times Z_1=Z_1$$

Similarly, the calculation module $24_N$ for the last transmission channel N issues a combined confidence index $CCSI_N$ equal to the sum of the confidence indices for each of the channels 1 to N and a stream of combined data from data and confidence indices for each channel, such that:

$$CCSI_N = \sum_{j=1}^{N} CSI_j$$

and $$CZ_N=\alpha_N \times CZ_{N-1}+(1-\alpha_N) \times Z_N, \text{ wherein } \alpha_N=CCSI_{N-1}/CCSI_N$$

This data forms the total combined confidence index and the total stream of combined data that are introduced into the Viterbi decoder 30, which issues at the output an optimised signal relative to the received data streams.

It appears, therefore that the total combined datum for the last channel may be expressed as follows:

$$CZ_N = \sum_{j=1}^{N} \frac{CSI_i}{CCSI_N} Z_j,$$

and corresponds to an optimal ratio combined datum, as defined by the teaching of the aforementioned article by Brennen.

The output signal may then be used in the conventional manner, for example, this data is demultiplexed and decoded in order to issue various types of data, such as audio data and video data.

Advantageously, the demodulators $14_1$ to $14_N$ may be configured using a limited number of demodulators, associated with buffer memories and used in a recursive manner with all of the reception channels.

The demodulators $14_i$ may be configured using conventional electronic components, FPGA-type programmed components, ASIC-type components dedicated to these functions, or microprocessor components, such as DSPs. Similarly, all of the reception channels may, in their entirety or in part, be produced using programmed components, the connections whereof are configured for implementing these functions.

Moreover, the means for formatting the received data streams may comprise elements other than those described, and may be arranged differently, depending on the situation.

Furthermore, the elementary functions forming the described calculation modules may be constructed or produced differently from the described embodiment.

It appears, therefore, that owing to the iterative construction of the reception channels, a device according to the invention allows the number of components used to be reduced and utilises a modulable architecture that may easily be adapted to the number of reception channels.

Moreover, apart from the first and last ones, the various reception channels may be combined in different orders.

Although the invention has been described in the context of the reception of television signals, it also applies to the multiple reception of any signal for transmitting digital information, such as mobile telephony signals or any other digital signals.

Similarly, the transmitted signal may be modulated in various formats, such as OFDM, COFDM, QAM and QPSK.

What is claimed:

1. An apparatus for receiving a modulated signal, said apparatus comprising:
a plurality of successive reception channels configured to receive a data stream corresponding to the modulated signal, each reception channel comprising:
a module for determining a confidence index of the received data stream, and
an equalization module configured to issue a stream of equalized data from the received data stream and from the confidence index,
a calculation module,
wherein the calculation module of the first reception channel is configured to issue a combined confidence index and a stream of combined data from the confidence index and from the stream of equalized data of the first reception channel, and wherein the calculation module of each reception channel following the first reception channel is configured to issue a combined confidence index and a stream of combined data from:
the confidence index of the current channel,
the stream of equalized data of the current channel,
the combined confidence index of the preceding channel, and
a stream of combined data of the preceding reception channel,
a decoder configured to process the combined confidence index and the stream of combined data issued only from the calculation module of the last channel.

2. The apparatus according to claim 1,
wherein the calculation module of each reception channel following the first reception channel comprises a first elementary calculation means configured to generate the combined confidence index ($CCSI_i$) from:
the confidence index ($CSI_i$) of the current channel, and
the combined confidence index ($CCSI_{i-1}$) of the preceding channel; and wherein $CCSI_i = CSI_i + CCSI_{i-1}$.

3. The apparatus according to claim 2,
wherein the calculation module of each reception channel following the first reception channel comprises a second elementary calculation means configured to generate a weighting coefficient $\alpha_i$ and the complement of the weighting coefficient $\alpha_i$ relative to 1 from the combined confidence indices $CCSI_{i-1}$ and $CCSI_{i-1}$, for the current and preceding reception channels and
wherein $\alpha_i = CCSI_{i-1}/CCSI_i$.

4. The apparatus according to claim 3,
wherein the calculation module of each reception channel following the first reception channel comprises a third elementary calculation means configured to generate the stream of combined data $CZ_i$, from;
the stream of combined data $CZ_{i-1}$ of the preceding channel,
the data stream $Z_i$, of the current reception channel, and
the weighting coefficient $\alpha_i$ of the current channel, and
wherein $CZ_i = \alpha_i \times CZ_{i-1} + (1-\alpha_i) \times Z_i$.

5. The apparatus according to claim 1, wherein the calculation module of each reception channel following the first reception channel comprises a synchronization module configured to synchronize the stream of combined data and the combined confidence index issued by the preceding reception channel, and the data stream and the confidence index issued by the current reception channel.

6. The apparatus according to claim 1, wherein each reception channel comprises means for formatting the received data stream, said means for formatting comprising at least one of the following elements: a tuner, an amplifier and a converter.

7. The apparatus according to claim 1 wherein the input is a multi-carrier signal.

8. The apparatus according to claim 7, wherein the input signal is an OFDM or COFDM signal.

9. The apparatus according to claim 7, wherein the input signal include receive television signals.

* * * * *